June 17, 1941.                H. A. MULLETT                2,245,934
                WATER SUPPLY CONTROL FOR WASH FOUNTAINS
                Filed Oct. 19, 1938            3 Sheets-Sheet 1

INVENTOR
HOWARD A. MULLETT

BY
*Quarles & French*

ATTORNEYS

June 17, 1941. H. A. MULLETT 2,245,934
WATER SUPPLY CONTROL FOR WASH FOUNTAINS
Filed Oct. 19, 1938 3 Sheets-Sheet 2
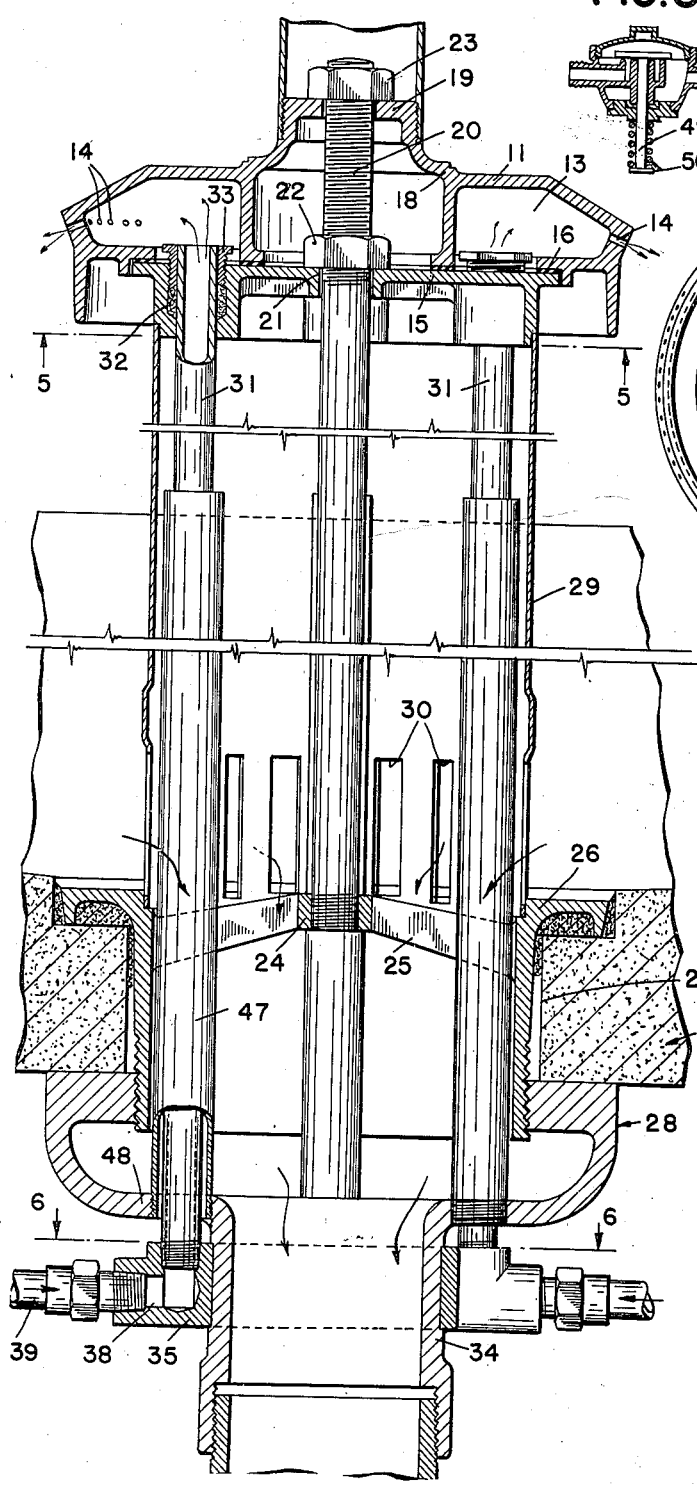
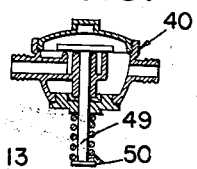
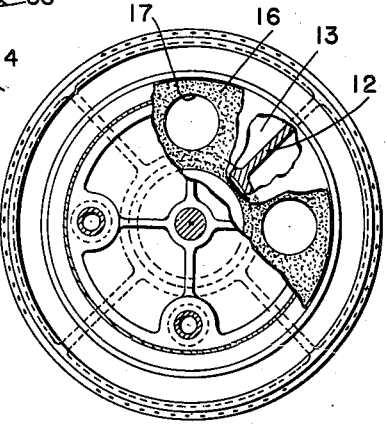
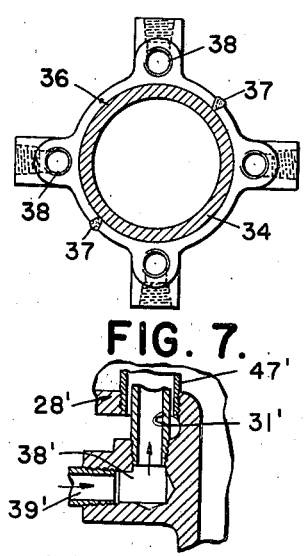
INVENTOR
HOWARD A. MULLETT
BY
Quarles & French
ATTORNEYS June 17, 1941.   H. A. MULLETT   2,245,934
WATER SUPPLY CONTROL FOR WASH FOUNTAINS
Filed Oct. 19, 1938   3 Sheets-Sheet 3

INVENTOR
HOWARD A. MULLETT

BY
*Quarles & French*

ATTORNEYS

Patented June 17, 1941

2,245,934

UNITED STATES PATENT OFFICE 2,245,934

WATER SUPPLY CONTROL FOR WASH FOUNTAINS

Howard A. Mullett, Milwaukee, Wis., assignor to Bradley Washfountain Company, Milwaukee, Wis., a corporation of Wisconsin Application October 19, 1938, Serial No. 235,737

11 Claims. (Cl. 4—191)

This invention relates to improvements in foot controlled wash fountains.

Wash fountains in which a number of persons may wash about a centrally disposed water supply usually have the control for such supply turned on and off by hand, and the water as a result, because of the failure of the users to turn off the supply, is frequently left running, and considerable water is thereby wasted. In those wash fountains where the entire supply of water is controlled by a single foot controlled valve, there is likewise considerable waste of water when only a part of the fountain is in use. To avoid the waste of water mentioned above there is a type of wash fountain in which the flow of the water is to sectional portions of the fountain, and each section is controlled by the foot of the individual user. A fountain of this type is shown in the prior U. S. patent to Howard A. Mullett et al. No. 1,836,766, dated December 15, 1931. The present invention has for its main object to improve upon wash fountains of the type above described and particularly that of said patent whereby the head structure and the valve structure are considerably simplified.

A further object is to provide a simple form of valve actuator for each of the sectional controls, so arranged as to permit the user to obtain washing water by providing a depressible foot rail operable at almost any point of its periphery.

A further object is to provide an especially sanitary arrangement for extending the supply pipes through the drain without danger of contaminating the supply of fresh water from the drain.

The invention further consists in the several features hereinafter described and more particularly defined by claims at the conclusion hereof.

In the drawings:

Fig. 4 is an enlarged vertical sectional view taken on the line 4—4 of Fig. 2;

Fig. 5 is a detailed sectional view taken on the line 5—5 of Fig. 4;

Fig. 6 is a detailed sectional view taken on the line 6—6 of Fig. 4;

Fig. 7 is a detailed vertical sectional view showing certain modifications;

Fig. 8 is a detailed vertical sectional view through one of the control valves;

Figure 1:
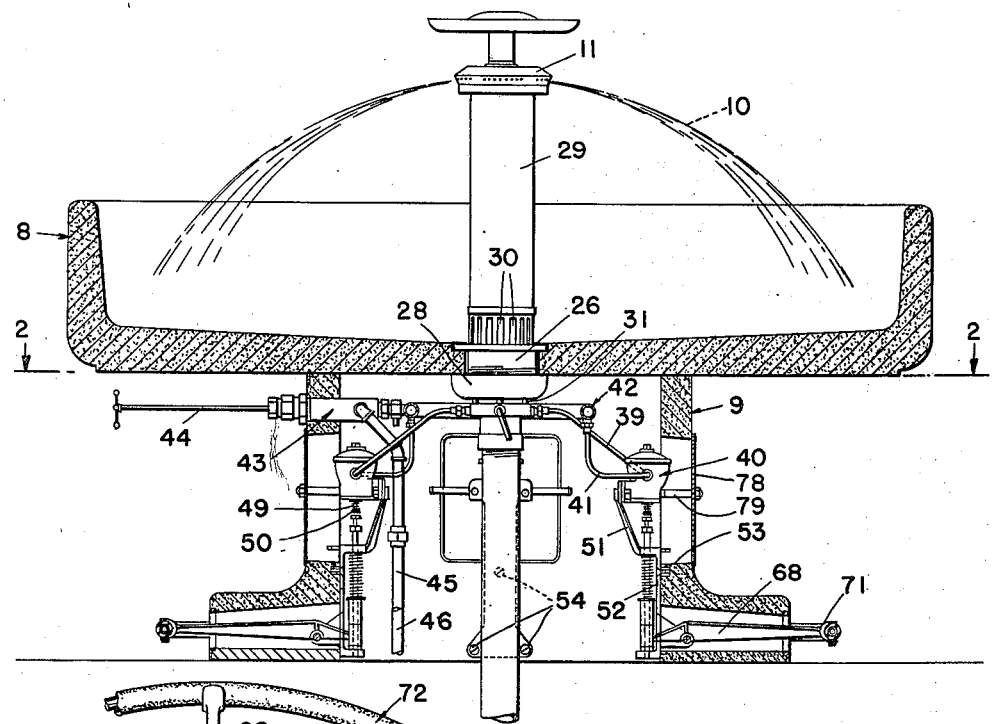
Fig. 1 is a vertical sectional view through a wash fountain embodying the invention.
Figure 2:
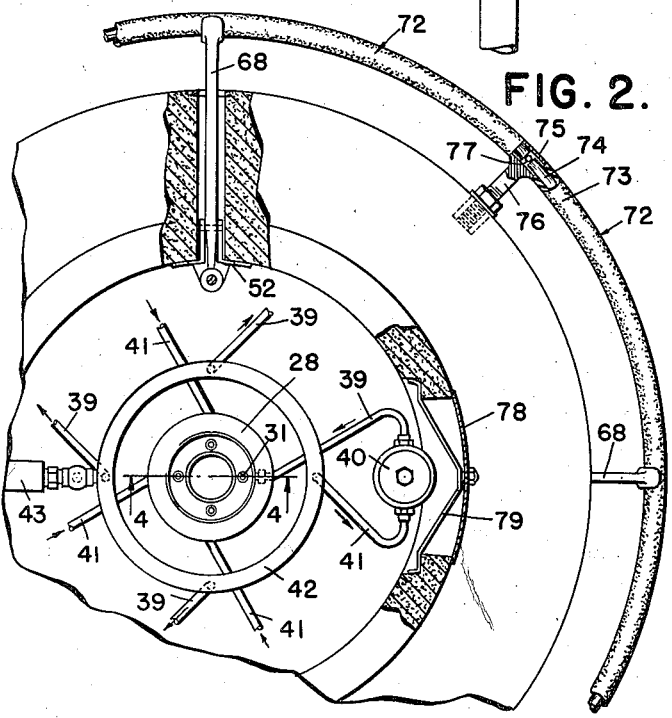
Fig. 2 is a detailed horizontal sectional view taken on the line 2—2 of Fig. 1.
Figure 3:
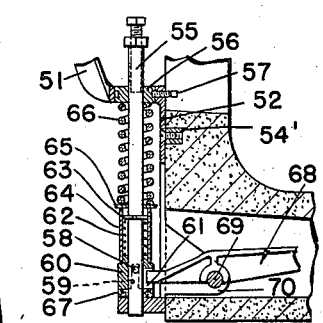
Fig. 3 is an enlarged vertical sectional view through a part of the valve structure, parts being broken away.

Referring to the drawings, the numeral 8 designates a basin or receptacle, preferably of circular or semi-circular form, which is supported upon a hollow tubular standard 9. The basin may be formed of any suitable material and of any desired form, but is preferably adapted to receive downwardly directed sprays of water 10 from a centrally located source.

The sprays are here shown as formed by a spraying device which includes a sprayhead casing 11 which, as shown in Figs. 4 and 5, is divided by partitions 12 into a series of annular compartments 13, each of said compartments provided with a series of spray openings 14 radially or otherwise suitably disposed relative to the center of the head and adapted to direct streams of water outwardly and downwardly toward the outer wall of the basin. The compartments 13 are open at their bottom wall, and these openings are sealed off by a base plate 15 which is clamped against the flat bottom portion of the head with a gasket 16 interposed therebetween and having openings 17 formed therein. The part 11 of the head has a hollow central portion 18 with an apertured cap 19 through which a clamping bolt 20 projects, which bolt may be in threaded engagement with a threaded hole 21 in the base plate 15, the bolt having a lock nut 22 mounted thereon adjacent the plate 15 and a clamping nut 23 mounted thereon to engage the cap 19.

The sprayhead may be supported above the basin in any suitable manner, and as shown the bolt 20 extends down into clamping engagement with the threaded central portion 24 of a spider 25 which is formed integral with the flanged drain spud 26 which is mounted in the central opening 27 in the basin and has threaded engagement at its lower end with the threaded upper end of a drain fitting or pipe section 28.

A tubular member 29 is interposed between the lower end of the base plate 15 and the top portion of the spud 26, said member 29 provided with a series of radially disposed drain openings 30.

Each of the compartments 13 has a supply pipe 31 connected thereto, the connection being shown in detailed section in Fig. 4 wherein the upper end of the pipe 31 projects through the annular packing gland 32 which is clamped about it by a gland nut 33 which has threaded engagement with the bottom or base plate 15 of the head.

The fitting 28 has a contracted or reduced lower end 34 which, as shown in Figs 4 and 6, has a separate fitting 35 secured thereto and formed by half sections 36 brazed together at 37. Each half section includes elbow conduits 38 disposed at right angles to each other, each of said conduits having threaded openings. One of the pipes 31 is in threaded engagement with the upwardly projecting branch of each conduit 38 while the other branch of each conduit 38 is provided with a supply pipe 39 which leads to the outlet end of a control valve casing 40. The inlet end of the casing 40 has a supply pipe 41 connecting it with a manifold 42.

The manifold 42 is supplied with water through a suitable mixing valve mechanism 43 for furnishing tempered water to said manifold under the control of a regulating handle 44, said valve mechanism 43 provided with supply pipes 45 and 46 leading from any suitable source of cold and hot water supply, one of these pipes 45 being shown in detail in Fig. 1.

Referring to Fig. 4, it will be noted that each of the supply pipes 31 is entirely separate from the fitting 28 and extends up through a pipe 47 and is spaced therefrom. Each of the pipes 47 is in threaded engagement with the lower wall of the enlarged portion 48 of the member 28 and extends up to a position above the high water level in the basin or preferably to a position somewhat above the height of the side of the basin. Thus the inlet water supply connections are entirely separate from the drain connection fittings, so that if a drain fitting should be defective, it will not contaminate the supply water but will escape to atmosphere. This is the preferred arrangement, but in some instances the structure shown in Fig. 7 is used wherein a drain fitting 28', generally similar to the fitting 28, has elbow conduits 38', similar to the conduits 38 but formed integral with the wall of the fitting 28 which is made extra heavy at these points so as to prevent danger of possible leakage from the drain fitting to the inlet connections. The supply pipes 31', similar to the pipes 31, have threaded engagement with the outlet ends of the conduits 38. The pipes 39', similar to the pipes 39, connect with the inlet ends of said conduits 38'. Pipes 47', similar to the pipes 47, have threaded engagement with the fitting 28' and are spaced from the pipes 31', so that the supply pipe sections 31' are entirely separate from the drain fitting 28'.

The valve casing 40 houses any suitable form of cut off or control valve 49 which may be operated by a reciprocatory actuator. One form of control valve mechanism is shown in section in Fig. 8 and comprises the valve 49 and a spring 50 to move said stem to a valve-closing position. The invention is not to be limited to the cut off valve herein shown, as there are many forms of valves that could be used, and the invention does not reside in any specific form of valve structure. The casing 40 is mounted on the outstanding arm 51 of a bracket 52 which is secured to the pedestal adjacent a hand hole 53 therein by three screws 54, which in the case of a cement composition pedestal are anchored in threaded ferrules 54' embedded in said pedestal.

Figure 9:
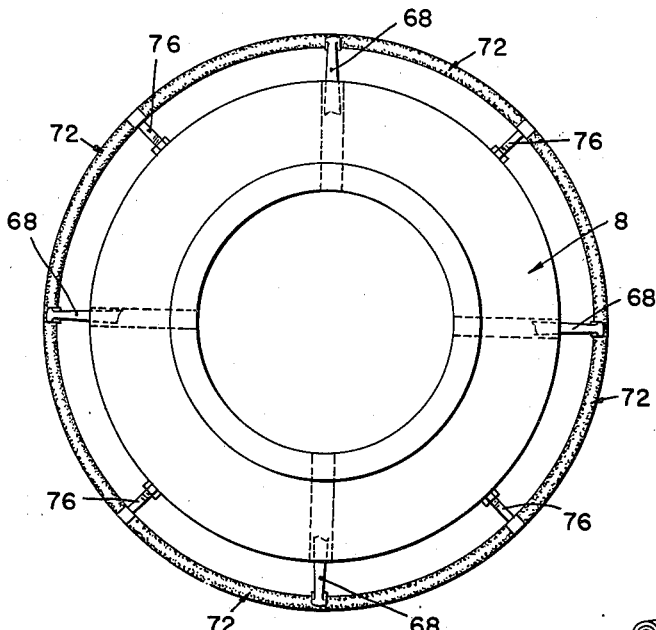
Fig. 9 is an enlarged view similar to Fig. 2, the valves and the piping being omitted.
Figure 11:
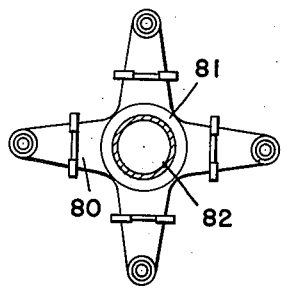
Fig. 11 is a detailed horizontal sectional view taken on the line 11—11 of Fig. 10.

The bracket 52 has an actuator or operating rod 55 slidably guided in its lower end and guided in a guide block 56 removably secured to the upper portion of the bracket by a set screw 57. The rod 55 has a pin 58 extending transversely through it adjacent its lower end and into a longitudinal slot 59 in a block 60 having a groove 61 therein. The block 60 is normally moved to a lower position by a spring 62 interposed between said block and a pin 63 on the rod. A sleeve 64 surrounds the spring 62 and has a washer 65 mounted on the upper end thereof, and a return spring 66 is interposed between said washer 65 and the block 56. A noise-absorbing pad 67 of felt or other suitable material is interposed between the base of the bracket and the block 56. An actuating lever 68 is pivotally mounted intermediate its ends on a pin 69 carried by the inwardly extending arms 70 of the bracket 52. The inner end of the lever 68 engages in the groove 61 of the block 60, and the outer end 71 of the lever is forked to engage a rubber covered ring sector 72. Each of the sectors 72 has a rubber covering ring portion 73 and a metal rod portion 74 whose ends project beyond the ends of the rubber portion and into one end of a socket 75 formed in a bracket 76 which projects laterally from the base of the pedestal. To hold the sectors in operating position, the socket 75 has a centrally located hole through which a pin 77 may be inserted, and under these conditions each of the sectors 72 at any location except in immediate juxtaposition may be moved independently of the others by the pressure of the operator's foot and in an amount sufficient to swing the lever 68 so as to move the rod 55 upwardly sufficiently to open the valve, the lever even having a small amount of over-travel which is taken care of by the relative movement between the block 60 and the rod 55 which allows a small amount of independent travel of the block 60 against the action of the spring 62. The sectors 72 assembled together, as noted above, form in effect an articulated circular ring having a plurality of hinge points, the full ring being shown in Fig. 9. In assembling the sectors 72 in position, the pins 77 are temporarily removed from their brackets, so that the rods 74 may have a certain amount of longitudinal movement in the bracket, the outer casing 73 yielding for this purpose.

The upper end of the rod 55 has a tappet screw adjustably mounted therein, so that its relation to the stem 49 may be readily adjusted for best operating conditions. Each of the hand holes 53 is normally covered by a cover plate 78 secured in position by a yielding bracket 79.

Figure 10:
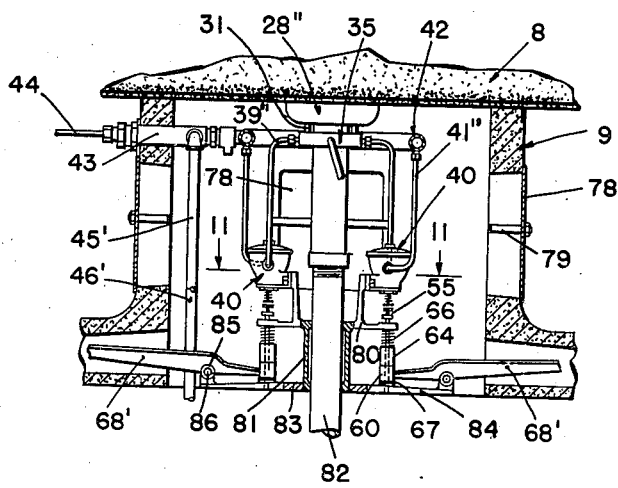
Fig. 10 is a detailed vertical sectional view through the pedestal showing certain modifications in the valve arrangement.

Instead of separately mounting each valve on the pedestal, I may provide the arrangement shown in Fig. 10 wherein each of the valves 40 is mounted on the arms of a bracket 80 which has a central tubular portion 81 through which the drain pipe 82 extends and whose base may be formed integral with or secured to a spider 83 whose arms 84 have pivot ears 85 for the pivot pins 86 for the actuator levers 68', similar to the levers 68, but somewhat longer so that their inner ends may engage the block 60 which with the tube 64 and the spring 66 cooperate with the tappet rod 55 to actuate the valve 40' in the same manner as the first construction, the rod 55 being guided in one of the arms of the bracket 80.

It is to be noted that with this arrangement the support for the levers is separate from the pedestal and rests on the foundation within the pedestal.

With this modified arrangement, the manifold 42 is connected by a pipe 41" with the inlet side of each valve casing 40, and the outlet of said casing connects in each instance with one of the pipes 39" which connects with the fitting 35 that, as previously noted, connects with the pipes 31.

With the foregoing arrangement downward pressure of the foot on any one of the sectors 72 at any location except in immediate juxtaposition of adjacent sectors causes an opening of the control valve associated with this sector and the delivery of water from the spray openings 14 which are supplied by this particular valve, but the amount discharged is obviously less than that for the entire fountain, so that a saving in water will be effected.

Reference is here made to United States Letters Patent No. 2,196,301, dated April 9, 1940, of Herman E. Heine, for any common claimable subject matter herein.

I desire it to be understood that this invention is not to be limited to any particular form or arrangement of parts except in so far as such limitations are included in the claims.

What I claim as my invention is:

1. In a wash fountain, the combination of a wash basin, spraying means positioned above the basin for delivering streams of washing liquid to different areas of the basin, a support for said basin, valves mounted below the basin for controlling the supply of water to said spraying means, and an articulated control comprising a foot controlled ring sector for each of said valves.

2. In a wash fountain, the combination of a wash basin, spraying means positioned above the basin for delivering streams of washing liquid to different areas of the basin, a hollow pedestal supporting said basin, valves mounted in said pedestal for controlling the supply of water to said spraying means, and an articulated control comprising a foot controlled ring sector for each of said valves.

3. In a wash fountain, the combination of a wash basin, a fountain positioned above the basin and having a plurality of supply compartments, spraying means for each of said compartments, a pedestal for supporting said basin, water supply valves mounted on the inner wall of said pedestal, supply connections from said valves to said compartments including a vertically disposed pipe leading to each of said compartments, a drain connection leading from the basin and including a conduit fitting, said vertically disposed pipes extending through said conduit fitting, and a foot controlled actuator for each of said valves.

4. In a wash fountain, the combination of a wash basin, a fountain positioned above the basin and having a plurality of supply compartments, each of said compartments provided with discharge openings for discharging water outwardly toward the side of the basin, a hollow pedestal for supporting said basin, water supply valves mounted in the pedestal, supply connections from said valves to said compartments including a vertically disposed pipe leading to each of said compartments, a drain connection leading from the basin and including a conduit fitting, said vertically disposed pipes extending through said conduit fitting, an inlet manifold mounted within the pedestal and having connections to each of said valves, and a foot controlled actuator for each of said valves.

5. In a wash fountain, the combination of a wash basin, a hollow pedestal supporting said basin, a fountain positioned above the basin and having sectional compartments, a water supply connection for each of said compartments, a valve to control each of said connections, and means for separately operating each of said valves comprising a reciprocatory actuator, a bracket, on which said actuator is mounted, secured to the inner wall of said pedestal, and a lever operatively connected to said actuator and pivotally mounted on said bracket and having an exteriorly disposed operating connection.

6. In a wash fountain, the combination of a wash basin, a hollow pedestal supporting said basin, a fountain positioned above the basin and having sectional compartments, a water supply connection for each of said compartments, a valve to control each of said connections, a bracket supporting each of said valves and secured to the inner wall of the pedestal, an actuator for the valve slidably guided in its valve supporting bracket, and a lever operatively connected to said actuator and pivotally mounted on said bracket.

7. In a wash fountain, the combination of a wash basin, a hollow pedestal supporting said basin, a fountain positioned above the basin and having sectional compartments, a drain connection for the basin, water supply conduits for each of said compartments extending up through said drain connection, a valve within said pedestal for controlling the water supply to each of said conduits, a supporting bracket for each valve mounted within said pedestal, and means for actuating each valve including a lever pivotally carried by said bracket.

8. In a wash fountain, the combination of a wash basin, spraying means positioned above the basin for delivering streams of washing liquid to different areas of the basin, a support for said basin, valves mounted below the basin for controlling the supply of water to said spraying means, an articulated foot ring having a plurality of hinge points at which it is carried, the section of said ring between each of said hinge points being operatively connected to one of said valves to form an actuator therefor.

9. In a wash fountain, the combination of a wash basin, spraying means positioned above the basin for delivering streams of washing liquid to different areas of the basin, a support for said basin, valves mounted below the basin for controlling the supply of water to said spraying means, a plurality of radially arranged brackets carried by said support, and a foot operated means comprising ring sectors having their ends hingedly mounted in said brackets, each of said sectors being operatively connected to one of said valves to form an actuator therefor.

10. In a wash fountain, the combination of a wash basin, a fountain positioned above the basin and having a plurality of supply compartments, each of said compartments provided with discharge openings for discharging water outwardly toward the side of the basin, a hollow pedestal for supporting said basin, water supply valves mounted within the pedestal, a drain connection leading from the basin and including a conduit fitting, supply connections from said valves to said compartments including a vertically disposed pipe leading to each of said compartments and extending through said conduit fitting, and a connector member for said pipes carried by said drain fitting and to which the outlet connections from said valves are connected, and an inlet manifold mounted within the pedestal and having connections to each of said valves.

11. In a wash fountain, the combination of a wash basin, a hollow pedestal supporting said basin, a fountain positioned above the basin and having sectional compartments, a water supply connection for each of said compartments, a valve disposed within the pedestal to control each of said connections, an actuator for the valve including a vertically movable spring-returned tappet member, and a lever for operating said tappet having an overrunning connection therewith.

HOWARD A. MULLETT.